(12) United States Patent
Gouke

(10) Patent No.: US 7,604,879 B2
(45) Date of Patent: Oct. 20, 2009

(54) PERPENDICULAR MAGNETIC RECORDING MEDIUM AND MAGNETIC STORAGE APPARATUS

(75) Inventor: Takashi Gouke, Higashine (JP)

(73) Assignee: Fujitsu Limited, Kawasaki (JP)

( * ) Notice: Subject to any disclaimer, the term of this patent is extended or adjusted under 35 U.S.C. 154(b) by 96 days.

(21) Appl. No.: 11/603,520

(22) Filed: Nov. 21, 2006

(65) Prior Publication Data

US 2008/0024918 A1    Jan. 31, 2008

(30) Foreign Application Priority Data

Jul. 31, 2006    (JP)    ............................. 2006-208431

(51) Int. Cl.
     *G11B 5/66*      (2006.01)
(52) U.S. Cl. .................................................... 428/831
(58) Field of Classification Search ....................... None
See application file for complete search history.

(56) References Cited

U.S. PATENT DOCUMENTS

| | | | |
|---|---|---|---|
| 5,759,681 A | 6/1998 | Hosoe et al. | |
| 6,682,826 B2 * | 1/2004 | Shimizu et al. | .............. 428/828 |
| 6,893,748 B2 * | 5/2005 | Bertero et al. | ............ 428/828.1 |
| 7,226,674 B2 | 6/2007 | Koda et al. | |
| 7,368,185 B2 * | 5/2008 | Hirayama et al. | ........ 428/831.2 |
| 2005/0142388 A1 | 6/2005 | Hirayama et al. | |
| 2006/0275629 A1 * | 12/2006 | Ikeda et al. | .............. 428/831.2 |

FOREIGN PATENT DOCUMENTS

| | | |
|---|---|---|
| CN | 1136693 A | 11/1996 |
| CN | 1558399 A | 12/2004 |
| JP | 10-074620 | 3/1998 |
| JP | 10-74620 | 3/1998 |
| JP | 2001-216620 | 8/2001 |
| JP | 2002-216338 | 8/2002 |
| JP | 2003-123245 | 4/2003 |
| JP | 2005-327361 | 11/2005 |
| WO | WO 2004/070073 A2 | 8/2004 |
| WO | WO 2004/070711 A1 | 8/2004 |

OTHER PUBLICATIONS

MAchine translation ofJP 2005-327361, Watanabe et al., Nov. 2005.*

* cited by examiner

*Primary Examiner*—Holly Rickman
(74) *Attorney, Agent, or Firm*—Greer, Burns & Crain, Ltd.

(57) ABSTRACT

A perpendicular magnetic recording medium is provided with a substrate, a soft magnetic back layer provided on a surface of the substrate, an orientation controlling underlayer provided on the soft magnetic back layer, and a recording layer provided above the orientation controlling underlayer and having axes of easy magnetization approximately perpendicular to the surface of the substrate. The recording layer is made of a ferromagnetic material having an hcp crystal structure. The orientation controlling underlayer is made of a nonmagnetic material having an fcc crystal structure and having NiCr or NiCu as a main component.

18 Claims, 4 Drawing Sheets

FIG.3

| | CRYSTAL ORIENTATION | | MAGNETIC CHARACTERISTICS | | | RECORDING & REPRODUCING CHARACTERISTICS |
|---|---|---|---|---|---|---|
| | DIFFRACTION INTENSITY kcps | Δθ50 DEGREES | COERCIVITY Oe | NUCLEATION FIELD Oe | SQUARENESS RATIO | SNR dB |
| Emb1 | 55.4 | 4.62 | 4027 | −1709 | 1.0 | 11.1 |
| Emb2 | 60.8 | 3.53 | 4087 | −1726 | 1.0 | 10.8 |
| Emb3 | 56.3 | 5.08 | 4169 | −1861 | 1.0 | 10.7 |
| Emb4 | 27.3 | 6.24 | 4193 | −1932 | 1.0 | 10.8 |
| Cmp1 | 3.3 | 11.02 | 2816 | 283 | 0.7 | 3.2 |
| Cmp2 | 50.3 | 4.80 | 3786 | −1548 | 1.0 | 10.3 |

# PERPENDICULAR MAGNETIC RECORDING MEDIUM AND MAGNETIC STORAGE APPARATUS

BACKGROUND OF THE INVENTION

1. Field of the Invention

The present invention generally relates to perpendicular magnetic recording media and magnetic storage apparatuses, and more particularly to a perpendicular magnetic recording medium having an underlayer that is provided under a recording layer and is made up of a plurality of layers, and to a magnetic storage apparatus having such a perpendicular magnetic recording medium.

2. Description of the Related Art

Recently, due to the high data transfer capability and the large storage capacity of the magnetic storage apparatuses, the magnetic storage apparatuses are no longer used only for personal computers and servers, and there are growing needs to be used for navigation systems for vehicles, portable music players, HDD recorders, portable telephones and the like. For this reason, there are demands to further improve the storage capacity and the recording density of the magnetic storage apparatus.

The magnetic storage apparatus conventionally uses the magnetic recording medium employing the in-plane or longitudinal magnetic recording. The medium noise of the magnetic recording medium employing the longitudinal magnetic recording can be reduced by reducing a remanent magnetization and thickness product tBr and increasing a coercivity Hc of the recording medium. As the remanent magnetization and thickness product tBr is further reduced and the crystal grains of the recording layer become smaller, the remanent magnetization of the recording layer gradually decreases due to the effects of the thermal energy, and the so-called thermal stability deteriorates. In addition, because there is a limit to the magnitude of the recording head field, it is difficult to further increase the coercivity Hc. For these reasons, it is regarded that the further improvement of the recording density is difficult for the magnetic recording medium employing the longitudinal magnetic recording.

In order to further increase the recording density of the magnetic recording medium, there are active research and development of the magnetic recording medium employing the perpendicular magnetic recording, that is, the perpendicular magnetic recording medium. According to the perpendicular magnetic recording, there is an advantage in that the magnitude of the remanent magnetization of the recorded bits stabilizes as the recording density becomes higher, due to the effects of the counter field of the adjacent recorded bits. As a result, the thermal stability is improved in the case of the perpendicular magnetic recording medium.

In addition, the perpendicular magnetic recording medium has a soft magnetic back layer which is made up of a soft magnetic material and is interposed between the substrate and the recording layer. The recording and reproduction of information from and to the perpendicular magnetic recording medium is possible without providing the soft magnetic back layer. However, by using a combination of a single-pole head and the soft magnetic back layer, it is possible to greatly increase the magnetic field generated from the head at the time of the recording, and the generated magnetic field is approximately 1.3 times that of the conventional head for the longitudinal magnetic recording. Accordingly, the coercivity Hc obtainable in the perpendicular magnetic recording medium is higher than that obtainable in the longitudinal magnetic recording medium employing the longitudinal magnetic recording. Moreover, since the soft magnetic back layer sharply draws in the magnetic field generated from the head, the magnetic field gradient becomes small, to reduce the undesirable effects of the spreading of the signal that is written. Therefore, the perpendicular magnetic recording medium has various advantageous features compared to the longitudinal magnetic recording medium.

In order to further improve the recording density of the perpendicular magnetic recording medium, it is essential to reduce the medium noise. In order to reduce the medium noise, it is effective to reduce the orientation or alignment distribution of the axes of easy magnetization of the recording layer. The orientation or alignment distribution of the axes of easy magnetization indicates the extent to which the deviations of the axes of easy magnetization from a direction perpendicular to the substrate surface are distributed.

In the perpendicular magnetic recording medium, a technique has been proposed in a Japanese Laid-Open Patent Application No. 2002-216338, for example, to provide an intermediate layer between the soft magnetic back layer and the recording layer and to control the perpendicular orientation or alignment of the recording layer by the intermediate layer. According to this proposal, a stacked structure, made up of a first intermediate layer made of Cu and a second intermediate layer made mainly of CoCr, is provided between the soft magnetic back layer and the recording layer.

According to the proposal made in the Japanese Laid-Open Patent Application No. 2002-216338, it is expected that the orientation or alignment distribution of the axes of easy magnetization of the recording layer will become satisfactory due to the provision of the stacked structure made up of the first and second intermediate layers. However, because the second intermediate layer is made of a material (ferromagnetic material) having remanent magnetization, this causes the medium noise to increase. Consequently, at the high recording density, there was a problem in that the recording and reproducing characteristics may deteriorate due to the increased medium noise.

SUMMARY OF THE INVENTION

Accordingly, it is a general object of the present invention to provide a novel and useful perpendicular magnetic recording medium and magnetic storage apparatus, in which the problems described above are suppressed.

Another and more specific object of the present invention is to provide a perpendicular magnetic recording medium and a magnetic storage apparatus, which can reduce the orientation or alignment distribution of the axes of easy magnetization of the recording layer and realize good recording and reproducing characteristics.

Still another object of the present invention is to provide a perpendicular magnetic recording medium comprising a substrate; a soft magnetic back layer provided on a surface of the substrate; an orientation controlling underlayer provided on the soft magnetic back layer; and a recording layer provided above the orientation controlling underlayer and having axes of easy magnetization approximately perpendicular to the surface of the substrate, wherein the recording layer is made of a ferromagnetic material having an hcp crystal structure, and the orientation controlling underlayer is made of a non-magnetic material having an fcc crystal structure and having NiCr or NiCu as a main component. According to the perpendicular magnetic recording medium of the present invention, it is possible to reduce the orientation or alignment distribution of the axes of easy magnetization of the recording layer and realize good recording and reproducing characteristics.

The perpendicular magnetic recording medium may further comprise an orientation controlling intermediate layer, made of a nonmagnetic material having an hcp crystal structure, provided between the orientation controlling underlayer and the recording layer. In this case, it is possible to further reduce the orientation or alignment distribution of the axes of easy magnetization of the recording layer and realize good recording and reproducing characteristics.

A further object of the present invention is to provide a magnetic storage apparatus comprising at least one perpendicular magnetic recording medium comprising a substrate, a soft magnetic back layer provided on a surface of the substrate, an orientation controlling underlayer provided on the soft magnetic back layer, and a recording layer provided above the orientation controlling underlayer and having axes of easy magnetization approximately perpendicular to the surface of the substrate, wherein the recording layer is made of a ferromagnetic material having an hcp crystal structure, and the orientation controlling underlayer is made of a nonmagnetic material having an fcc crystal structure and having NiCr or NiCu as a main component; and a head comprising a recording element and a reproducing element, and configured to record information on the perpendicular magnetic recording medium by the recording element and to reproduce information from the perpendicular magnetic recording medium by the reproducing element. According to the magnetic storage apparatus of the present invention, it is possible to reduce the orientation or alignment distribution of the axes of easy magnetization of the recording layer and realize good recording and reproducing characteristics, and to realize a high-density recording.

Other objects and further features of the present invention will be apparent from the following detailed description when read in conjunction with the accompanying drawings.

BRIEF DESCRIPTION OF THE DRAWINGS

FIG. 3 is a diagram showing the crystal orientations of recording layers, magnetic characteristics, and recording and reproducing characteristics of embodiment samples and comparison examples.

DESCRIPTION OF THE PREFERRED EMBODIMENTS

Figure 1:
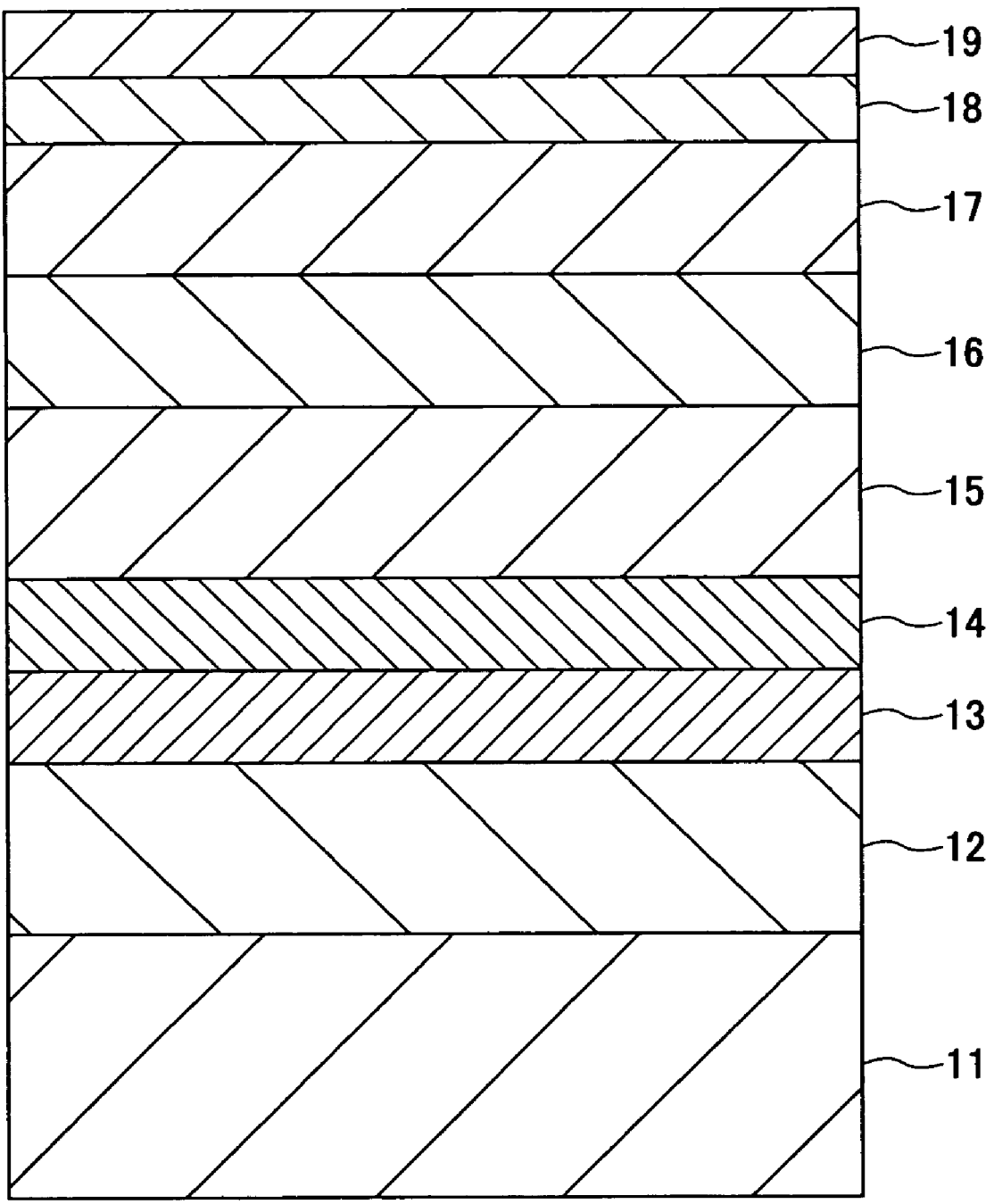
FIG. 1 is a cross sectional view showing a first embodiment of a perpendicular magnetic recording medium according to the present invention.

A description will be given of embodiments of the perpendicular magnetic recording medium and the magnetic storage apparatus according to the present invention, by referring to the drawings.

FIG. 1 is a cross sectional view showing a first embodiment of the perpendicular magnetic recording medium according to the present invention. As shown in FIG. 1, a perpendicular magnetic recording medium 10 has a substrate 11, a soft magnetic back layer 12, an amorphous layer 13, an orientation controlling underlayer 14, an orientation controlling intermediate layer 15, a first recording layer 16, a second recording layer 17, a protection layer 18, and a lubricant layer 19 that are successively stacked in this order. As will be described later in more detail, the orientation controlling underlayer 14 reduces the orientation or alignment distribution of the axes of easy magnetization of the first and second recording layers 16 and 17, and improves the recording and reproducing characteristics such as the signal-to-noise ratio (SNR), to realize a high recording density.

For example, the substrate 11 is formed by a plastic substrate, a crystallized glass substrate, a tempered glass substrate, a Si substrate, an Al alloy substrate or the like. In a case where the perpendicular magnetic recording medium 10 has a tape shape, the substrate 11 may be formed by a film made of polyester (PET), polyethylene naphthalate (PEN), refractory polyimide (PI) or the like. In the present invention, it is unnecessary to heat the substrate 11, thereby making it possible to use a resin substrate as the substrate 11.

The soft magnetic back layer 12 has a thickness of 20 nm to 2 μm, for example, and is made of an amorphous or a microcrystalline soft magnetic material that includes at least one element selected from a group consisting of Fe, Co, Ni, Al, Si, Ta, Ti, Zr, Hf, V, Nb, C and B. For example, the soft magnetic back layer 12 is made of CoNbZr, CoTaZr, FeCoB, FeTaC, FeAlSi or NiFe. By selecting the soft magnetic material forming the soft magnetic back layer 12 as described above, it is possible to suppress the saturation of the recording magnetic field and to suppress the so-called side-erase phenomenon. Furthermore, the soft magnetic back layer 12 may be made up of a single layer (that is, have a single-layer structure) or, made up of a plurality of stacked layers (that is, have a multi-layer structure).

Although an illustration thereof will be omitted, the soft magnetic back layer 12 may have a stacked ferrimagnetic structure made up of a pair of soft magnetic layers that are formed by the soft magnetic materials described above and sandwich an Ru layer. In this stacked ferrimagnetic structure, the pair of soft magnetic layers are antiferro-magnetically exchange-coupled via the Ru layer. Hence, the leak magnetic field from each of the pair of soft magnetic layers is cancelled, to thereby reduce the noise at the time of the reproduction.

The amorphous layer 13 has a thickness of 2.0 nm to 10 nm, for example, and is made of an amorphous nonmagnetic material having a main component selected from a group consisting of Ta, W and Mo. The amorphous layer 13 improves the crystal orientation of the crystal grains of the orientation controlling underlayer 14 that is formed on the amorphous layer 13, and also makes the grain diameters of the crystal grains of the orientation controlling underlayer 14 uniform.

From the point of view of further improving the crystal orientation of the orientation controlling underlayer 14, the amorphous layer 13 is preferably made of Ta. In addition, from the point of view of arranging the soft magnetic back layer 12 and the recording layer 15 close to each other, the amorphous layer 13 preferably has a single-layer structure made up of the materials described above, and the thickness of this single-layer structure forming the amorphous layer 13 is preferably 1.0 nm to 5.0 nm. Of course, the amorphous layer 13 may have a multi-layer structure made up of the materials described above. Although it is preferable to provide the amorphous layer 13 in the perpendicular magnetic recording medium 10, the amorphous layer 13 may be omitted.

The orientation controlling underlayer 14 is made of a nonmagnetic material having an fcc crystal structure and having NiCr or NiCu as a main component. The orientation controlling underlayer 14 has the fcc crystal structure, and the (111) crystal face grows preferentially in a direction approximately parallel to the substrate surface. The (0002) crystal face of the orientation controlling intermediate layer 15 having an hcp crystal structure grows epitaxially on the (111) crystal face of the orientation controlling underlayer 14. Since the (111) crystal face of the orientation controlling underlayer 14 and the (0002) crystal face of the orientation controlling intermediate layer 15 form a good lattice matching, the orientation controlling intermediate layer 15 on the orientation controlling underlayer 14 grows with extremely good crystallinity and crystal orientation. Accordingly, it is possible to reduce the orientation or alignment distribution of the c-axes of the first and second recording layers 16 and 17 which grow epitaxially on the orientation controlling intermediate layer 15. The c-axes of the first and second recording layers 16 and 17 are the axes of easy magnetization. In addition, in a case where the orientation controlling intermediate layer 15 is not provided, the orientation controlling underlayer 14 makes direct contact with the first recording layer 16, but it is also possible in this case to reduce the orientation or alignment distribution of the c-axes of the first and second recording layers 16 and 17.

The orientation controlling underlayer 14 becomes nonmagnetic since the main component thereof is NiCr or NiCu. For this reason, compared to a case where a ferromagnetic material such as Ni, Fe and NiFe is used for the orientation controlling underlayer 14, it is possible to eliminate the noise component generated from the orientation controlling underlayer 14 itself, and the noise reducing effect is high.

In a case where the orientation controlling underlayer 14 is made of NiCr, it is preferable that the Cr content is 10 at. % to 22 at. %. When the Cr content of the orientation controlling underlayer 14 made of NiCr becomes less than 10 at. %, the orientation controlling underlayer 14 becomes ferromagnetic, and the noise caused thereby tends to increase. On the other hand, when the Cr content of the orientation controlling underlayer 14 made of NiCr exceeds 22 at. %, the crystals of a bcc crystal structure start to mix into the crystals of the fcc crystal structure and the orientation controlling underlayer 14 starts to assume the twin crystal state which introduces undesirable effects on the crystal orientation of the orientation controlling intermediate layer 15.

In a case where the orientation controlling underlayer 14 is made of NiCu, it is preferable that the Cu content is 40 at. % to 99 at. %, and more preferably 40 at. % to 50 at. %. The Cu content of the orientation controlling underlayer 14 made of NiCu is preferably 40 at. % or greater because the orientation controlling underlayer 14 becomes ferromagnetic when the Cu content is less than 40 at. %, and the noise caused thereby tends to increase.

The orientation controlling underlayer 14 may further be added with at least one element (additive element) selected from a group consisting of Fe, Al, Rh, Pd, Ag, Pt and Au. The lattice spacing of the orientation controlling underlayer 14 can be controlled without deteriorating the crystallinity of the orientation controlling underlayer 14, even when the additive element is added, and a good epitaxial growth of the orientation controlling underlayer 14 is possible. Consequently, good crystallinity and crystal orientation of the orientation controlling intermediate layer 15 and the first and second recording layers 16 and 17 are obtained. Preferably, the content of the additive element is set in a range of 0.5 at. % to 20 at. %. When the orientation controlling intermediate layer 15 is not provided, the orientation controlling underlayer 14 may be adapted to the lattice spacing of the first recording layer 16 by adding the additive element described above.

Preferably, the orientation controlling underlayer 14 has a thickness set in a range of 1 nm to 20 nm. When the thickness of the orientation controlling underlayer 14 is less than 1 nm, the crystallinity of the orientation controlling underlayer 14 tends to deteriorate, and this is undesirable. On the other hand, when the thickness of the orientation controlling underlayer 14 exceeds 20 nm, the distance between the soft magnetic back layer 12 and the recording element becomes excessively large to deteriorate the write performance, and this is also undesirable. Therefore, by setting the thickness of the orientation controlling underlayer 14 to the thin range described above, it is possible to improve the crystallinity and the crystal orientation of the orientation controlling intermediate layer 15, and also greatly increase the coercivities of the first and second recording layers 16 and 17. Unless otherwise indicated, the coercivity described in this specification refers to the so-called perpendicular coercivity, that is, the coercivity in the direction perpendicular to the substrate surface.

The orientation controlling intermediate layer 15 is made of a nonmagnetic material having an hcp crystal structure. For example, the orientation controlling intermediate layer 15 is made of Ru, a nonmagnetic Ru—X alloy having an hcp crystal structure, or Ti, where X is at least one element selected from a group consisting of Co, Cr, Fe, Ni, Ta, B and Mn. Because the orientation controlling intermediate layer 15 has the hcp crystal structure, the orientation controlling intermediate layer 15 grows epitaxially, with good crystallinity and crystal orientation, on the orientation controlling underlayer 14 having the fcc crystal structure. In other words, the crystallinity of the orientation controlling intermediate layer 15 itself is improved, and the c-axes orientation becomes perpendicular with respect to the substrate surface to thereby improve the crystal orientation. As a result, the orientation controlling intermediate layer 15 improves the crystal orientations of the first and second recording layers 16 and 17. For this reason, the orientation or alignment distribution of the axes of easy magnetization (c-axes) of the first and second recording layers 16 and 17 is reduced, and the recording and reproducing characteristics of the perpendicular magnetic recording medium 10 are improved.

It is preferable that the orientation controlling intermediate layer 15 is made of a material selected from a group consisting of Ru, RuCo, RuCoCr, RuCoB and RuCoCrTa. The lattice spacing of the materials of this group is approximately the same as the lattice spacing of the first recording layer 16, and a good lattice matching is obtained between the orientation controlling intermediate layer 15 and the first recording layer 16. Hence, the orientation or alignment distribution of the axes of easy magnetization (c-axes) of the first and second recording layers 16 and 17 is reduced, and the recording and reproducing characteristic improve. In this case, a good lattice matching is also obtained between the orientation controlling intermediate layer 15 and the orientation controlling underlayer 14.

In addition, the orientation controlling intermediate layer 15 increases the coercivities of the first and second recording layers 16 and 17 depending on the thickness of the orientation controlling intermediate layer 15. Accordingly, in order to obtained desired coercivities of the first and second recording layers 16 and 17, the ferromagnetic material of the first and second recording layers 16 and 17 and the thickness of the orientation controlling intermediate layer 15 are appropriately selected. Moreover, as will be described later, it is possible to greatly increase the coercivities of the first and second recording layers 16 and 17 by the provision of the orientation controlling underlayer 14 under the orientation controlling intermediate layer 15.

From the point of obtaining the good magnetic characteristics and recording characteristic, it is preferable to provide the orientation controlling intermediate layer 15 as described above. However, it is not essential to provide the orientation controlling intermediate layer 15 depending on the characteristics required of the perpendicular magnetic recording medium 10.

The recording layer of the perpendicular magnetic recording medium 10 is made up of the first and second recording layers 16 and 17 which store the recorded information.

The first and second recording layers 16 and 17 include a ferromagnetic material having an hcp crystal structure. For example, the ferromagnetic material used for the first and second recording layers 16 and 17 may be CoCr, CoPt, CoCrTa, CoCrPt or CoCrPt-M, where M is at least one element selected from a group consisting of B, Mo, Nb, Ta, W and Cu. The first and second recording layers 16 and 17 may be a so-called continuous layer, that is, a ferromagnetic layer made up solely of a recording layer ferromagnetic layer.

At lest one of the first and second recording layers 16 and 17 may be formed within an atmosphere including oxygen gas when sputtering the recording layer ferromagnetic material, so that the ferromagnetic material includes oxygen. Hence, oxygen is introduced at a grain interface portion which is an interface of the magnetic grains, and the thickness of the grain interface portion increases to further increase the separation of the magnetic grains. Consequently, the medium noise is reduced and the SNR is improved. The recording layer ferromagnetic material used for the first and second recording layers 16 and 17 has a composition including O (oxygen), such as CoCr—O, CoCrPt—O and CoCrPt-M-O.

In addition, at least one of the first and second recording layers 16 and 17 may be formed by a so-called granular layer, which is an nonsolid solution layer made up of magnetic grains made of the recording layer ferromagnetic material and a nonmagnetic material surrounding the magnetic grains. The magnetic grains has a columnar structure that grows in a direction approximately perpendicular with respect to the substrate surface from the surface of the orientation controlling intermediate layer 15, and the magnetic grains are mutually separated in a direction in-plane with respect to the substrate surface by the nonsolid solution phase. The nonsolid solution phase is formed by a nonmagnetic material which does not dissolve with the ferromagnetic material forming the magnetic grains or, by a nonmagnetic material which does not form a compound. For example, the nonsolid solution phase is made of a compound of one element selected from a group consisting of Si, Al, Ta, Zr, Y, Ti and Mg and one element selected from a group consisting of O, N and C. The nonsolid solution phase may be an oxide such as $SiO_2$, $Al_2O_3$, $Ta_2O_5$, $ZrO_2$, $Y_2O_3$, $TiO_2$ and MgO, a nitride such as $Si_3N4$, AlN, TaN, ZrN, TiN and $Mg_3N_2$, and a carbide such as SiC, TaC, ZrC and TiC. The mutually adjacent magnetic grains are physically separated by the nonsolid solution phase made of the nonmagnetic materials described above, and the magnetic interaction of the magnetic grains is reduced. As a result, the medium noise is reduced and the SNR is improved.

Of the compositions of the granular layer described above, it is preferable that the magnetic grains are made of CoCrPt or CoCrPt-M, and that the nonsolid solution layer is made of an oxide. More preferably, the nonsolid solution layer is made of $SiO_2$ or $TiO_2$. According to this combination, the magnetic grains are separated approximately uniformly by the nonsolid solution layer, and good magnetic characteristics and recording and reproducing characteristics can be obtained.

It is particularly preferable that the first magnetic layer 16 is formed by the granular layer described above. Because the surface of the orientation controlling intermediate layer 15 has good crystallinity and crystal orientation, the first recording layer 16 grows epitaxially on the crystal grains of the orientation controlling intermediate layer 15. Hence, the magnetic grains of the first recording layer 16 are formed in a mutually separated manner, and the crystallinity and the crystal orientation of the magnetic grains are improved. For this reason, the medium noise generated from the first recording layer 16 itself is reduced. Furthermore, the first recording layer 16 has good effects on the arrangement of the magnetic grains, the crystallinity and the crystal orientation of the second recording layer 17. Consequently, the arrangement of the magnetic grains, the crystallinity and the crystal orientation of the recording layer as a whole are improved. As a result, the medium noise from the recording layer as a whole is reduced, the orientation or alignment distribution of the axes of easy magnetization is reduced, and the recording and reproducing characteristics are improved.

In a case where the first recording layer 16 is formed by the granular layer described above, it is particularly preferable that the second recording layer 17 is a continuous layer or a granular layer. In a case where the second recording layer 17 is formed by the continuous layer made of the recording layer ferromagnetic material, the magnetic grains are separated by the grain boundary portion, but the magnetic interaction of the magnetic grains is stronger than that of the granular layer. Hence, the proper interaction of the second recording layer 17 acts on the magnetic grains of the first recording layer 16, and urges the magnetic reversal of the magnetic drains of the first recording layer 16. Consequently, the hysteresis loop becomes a rectangular shape, and thus, good magnetic characteristics are obtained. As a result, the recording and reproducing characteristics of the perpendicular magnetic recording medium 10 are improved.

In addition, in a case where both the first and second recording layers 16 and 17 are formed by the granular layer, the medium noise is further reduced, and the SNR is further improved. In this case, it is preferable that the nonsolid solution layer-content of the second recording layer 17 is set smaller than the nonsolid solution layer content of the first recording layer 16, because the remanent magnetization and thickness product of the recording layer as a whole increases and a sufficiently large reproduced output can be secured. In addition, the interaction of the magnetic grains in the second recording layer 17 can be made larger than the interaction of the magnetic grains in the first recording layer 16, to thereby make the hysteresis loop have a rectangular shape and realize good magnetic characteristics. As a result, the recording and reproducing characteristics of the perpendicular magnetic recording medium 10 are improved.

In a case where the magnetic grains of the granular layer described above is made of CoCrPt-M, it is preferable that the Co content is 50 at. % to 80 at. %, the Pt content is 15 at. % to 30 at. %, the M content is greater than 0 at. % and 20 at. % or less, and the Cr content amounts to the remaining at. %. By setting the Pt content of the magnetic grains large compared to that of the conventional perpendicular magnetic recording medium, it is possible to increase the anisotropic magnetic field and increase the coercivity in the direction perpendicular with respect to the substrate surface.

Moreover, one of the first and second recording layers 16 and 17 may be formed by a ferromagnetic artificial lattice layer which has a stacked structure made up of alternately stacked thin films of a ferromagnetic element and a nonmagnetic element. Examples of the ferromagnetic artificial lattice layer include a Co/Pd artificial lattice layer made up of alternately stacked Co and Pd layers, and a Co/Pt artificial lattice layer made up of alternately stacked Co and Pt layers. The ferromagnetic artificial lattice layer has axes of easy magnetization perpendicular to the layer surface thereof. Since the ferromagnetic artificial lattice layer can obtain an uniaxial anisotropy constant larger than that of the recording layer ferromagnetic material, it is possible to easily increase the coercivity. For this reason, even when the orientation controlling intermediate layer 15 is made thin, it is possible to obtain a perpendicular magnetic recording medium 10 having a desired coercivity. In addition, the distance between the soft magnetic back layer 12 and the recording element can be reduced, and the recording magnetic field can be concentrated to improve the recording characteristic. Each of the Co layer, the Pd layer and the Pt layer forming the ferromagnetic artificial lattice layer may be repeated in units of one layer or two layers.

The first and second recording layers 16 and 17 are formed by ferromagnetic layers made of recording layer ferromagnetic materials having mutually different compositions. In other words, the first and second recording layers 16 and 17 are made of recording layer ferromagnetic materials that are combinations of mutually different elements or, made of recording ferromagnetic materials that are combinations of the same elements but with mutually different element contents.

A sum total of the thicknesses of the first and second recording layers 16 and 17, that is, the thickness of the recording layer as a whole, is preferably set in a range of 3 nm to 20 nm to suit the high recording density to be realized, and is more preferably set in a range of 5 nm to 15 nm.

It is preferable that an anisotropic field Hk of the first recording layer 16 and an anisotropic field Hk2 of the second recording layer 17 satisfy a relationship Hk1>Hk2. The recording is facilitated by making the anisotropic field Hk2 of the second recording layer 17, which is closer to the recording element, lower than the anisotropic field Hk1 of the first recording layer 16. In a case where the recording layer magnetic material is CoCrPt or CoCrPt-M, an example of the combination of the first and second recording layers 16 and 17 is set so that the Pt content of the magnetic grains in the second recording layer 17 is smaller than the Pt content of the magnetic grains in the first recording layer 16. Because the anisotropic field changes depending on the Pt content of each of the first and second recording layers 16 and 17, the Pt content is set so as to satisfy the relationship Hk1>Hk2. The Pt content of the second recording layer 17 may be zero. In this case, the first and second recording layers 16 and 17 may be formed by the granular layers, where the first recording layer 16 is made of CoCrPt—$SiO_2$ (CoCrPt magnetic grains and $SiO_2$ nonsolid solution layer), and the second recording layer 17 is made of CoCr—$SiO_2$ (CoCr magnetic grains and $SiO_2$ nonsolid solution layer).

The protection layer 18 is not limited to a particular material. For example, the protection layer 18 is made of amorphous carbon, carbon hydroxide, carbon nitride, aluminum oxide or the like, and has a thickness of 0.5 nm to 15 nm.

The lubricant layer 19 is not limited to a particular material. For example, the lubricant layer 19 is made of a lubricant having perfluoropolyether as the principal chain. The lubricant layer 19 may be provided or, not provided, depending on the material used for the protection layer 18.

According to the perpendicular magnetic recording medium 10 of this first embodiment, the orientation controlling underlayer 14 is made of the nonmagnetic material having, as the main component, NiCr or NiCu which has the fcc crystal structure. Accordingly, the crystallinity and the crystal orientation of the orientation controlling intermediate layer 15 which has the hcp crystal structure and is formed on the orientation controlling underlayer 14 are improved. As a result, the crystallinity and the crystal orientation of the first and second recording layers 16 and 17 that are formed on the orientation controlling intermediate layer 15 are improved. For this reason, the orientation or alignment distribution of the axes of easy magnetization, that is, the c-axes of the first and second recording layers 16 and 17 are reduced. At the same time, the magnetic characteristics are improved, to thereby improve the recording and reproducing characteristics of the perpendicular magnetic recording medium 10. Furthermore, since the orientation controlling underlayer 14 and the orientation controlling intermediate layer 15 are made of the nonmagnetic materials, it is possible to improve the SNR without the possibility of these layers 14 and 15 becoming the medium noise generating sources. Therefore, it is possible to reduce the orientation or alignment distribution of the axes of easy magnetization of the recording layer as a whole, and realize the perpendicular magnetic recording medium 10 having the good recording and reproducing characteristics.

In addition, because the coercivities of the first and second recording layers 16 and 17 can be increased considerably by the provision of the orientation controlling underlayer 14, it is possible to make the orientation controlling intermediate layer 15 thin. Consequently, the distance between the soft magnetic back layer 12 and the recording element can be reduced, and the spreading of the recording magnetic field in the horizontal direction is suppressed, to thereby enable the recording magnetic field to be concentrated in a desired region of the first and second recording layers 16 and 17. As a result, the recording characteristic of the perpendicular magnetic recording medium 10 is improved.

When the orientation controlling intermediate layer 15 is not provided, the first recording layer 16 is provided on the orientation controlling underlayer 14. In this case, since the orientation controlling underlayer 14 has the fcc crystal structure, it is possible to improve the crystal orientation of the first and second recording layers 16 and 17 which have the hcp crystal structure.

Next, a description will be given of a method of producing the perpendicular magnetic recording medium 10 of this embodiment, by referring to FIG. 1.

First, the surface of the substrate 11 is cleaned and dried. Thereafter, the soft magnetic back layer 12 is formed on the substrate 11 by electroless plating, electroplating, sputtering, vacuum evaporation or the like.

Next, the amorphous layer 13 is formed on the soft magnetic back layer 12 by a sputtering apparatus used a sputtering target that is made of the material described above. Preferably, an extreme high vacuum sputtering apparatus which can be exhausted to $10^{-7}$ Pa in advance is used as the sputtering apparatus. More particularly, the amorphous layer 13 is formed by the D.C. magnetron method in an inert gas atmosphere, such as an Ar gas atmosphere, with the pressure set to 0.4 Pa, for example, and with the input power set to 0.5 kW, for example. In this state, it is preferable not to heat the substrate 11, because it is possible to suppress the crystals or the microcrystals of the soft magnetic back layer 12 from becoming large. Of course, it is possible to heat the substrate 11 to a temperature on the order of approximately 150° C. or less so that crystals or microcrystals of the soft magnetic back layer 12 will not become large. The temperature condition of the substrate 11 in the process of forming the orientation controlling underlayer 14, the orientation controlling intermediate layer 15, the first recording layer 16 and the second recording layer 17 is the same as that in the process of forming the amorphous layer 13.

Then, the orientation controlling underlayer 14, the orientation controlling intermediate layer 15, the first recording layer 16 and the second recording layer 17 are sequentially formed on the amorphous layer 13, using sputtering targets made of the materials described above. The conditions when forming each of the layers 14 through 17 are the same as the conditions when forming the amorphous layer 13.

In the process of forming the first recording layer 16 or the second recording layer 17, it is possible to use an atmosphere in which oxygen gas or nitrogen gas is added to the inert gas, an oxygen gas atmosphere or, a nitrogen gas atmosphere, instead of using the inert gas atmosphere described above. In this case, the magnetic grains in the first recording layer 16 or the second recording layer 17 assume a good separation state, and the medium noise is reduced, to enable a good SNR to be obtained.

In addition, in the case where the first recording layer 16 or the second recording layer 17 is formed by the granular layer, the granular layer is formed by simultaneously sputtering the ferromagnetic material and the nonmagnetic material of the nonsolid solution phase described above, within an inert gas atmosphere, using a sputtering target made of the ferromagnetic material and a sputtering target made of the nonmagnetic material of the nonsolid solution phase. In this case, if the nonmagnetic material is an oxide, nitride or carbide, the recording layer may be formed within an oxygen gas atmosphere, a nitrogen gas atmosphere, a carbon dioxide atmosphere or, a gas atmosphere in which oxygen gas, nitrogen gas or carbon dioxide gas is added to the inert gas. Accordingly, it is possible to suppress the content of each of the oxygen, nitrogen and carbon of the nonsolid solution phase from decreasing below that of the stoichiometric composition, and form a good recording layer. As a result, the durability and corrosion resistance of the perpendicular magnetic recording medium 10. Instead of using the two sputtering targets described above, it is of course possible to use a single sputtering target that is made of a composite material formed by the ferromagnetic material and the nonmagnetic material. In this case, it is possible to easily control the mole fraction of the magnetic grains and the nonsolid solution phase forming the first recording layer 16 or the second recording layer 17.

Next, the protection layer 18 is formed on the second recording layer 17 by a sputtering, a chemical vapor deposition (CVD), a filtered cathodic arc (FCD) or the like. In addition, the lubricant layer 19 is coated on the surface of the protection layer 18 by a lifting method, a spin-coating method, a submerging (or dipping) method or the like. The perpendicular magnetic recording medium 10 of this first embodiment is formed by the processes described above.

It is assumed for the sake of convenience that the process of forming the amorphous layer 13 up to the process of forming the second recording layer 17 are carried out using the D.C. magnetron method. However, it is of course possible to use other methods such as sputtering (for example, RF sputtering) and vapor evaporation.

Moreover, from the point of view of maintaining the surface cleanness of the substrate 11 or each of the layers 13 through 18, it is preferable that the process of forming the amorphous layer 13 up to the process of forming the protection layer 18 are carried out within a vacuum or film forming atmosphere that is maintained.

Next, a description will be given of a second embodiment of the perpendicular magnetic recording medium according to the present invention, by referring to FIG. 2.

Figure 2:
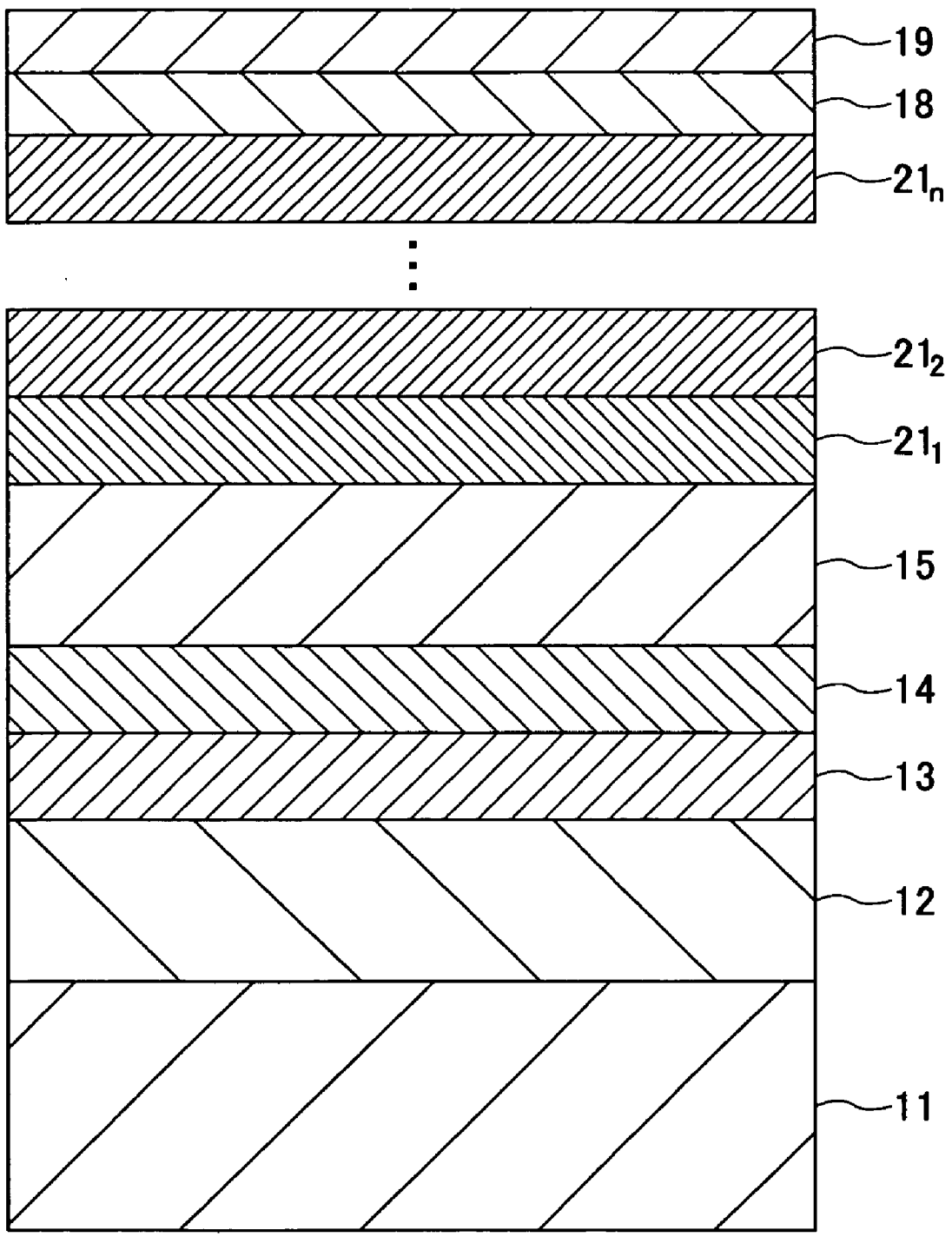
FIG. 2 is a cross sectional view showing a second embodiment of the perpendicular magnetic recording medium according to the present invention.

FIG. 2 is a cross sectional view showing this second embodiment of the perpendicular magnetic recording medium according to the present invention. In FIG. 2, those parts that are the same as those corresponding parts in FIG. 1 are designated by the same reference numerals, and a description thereof will be omitted.

As shown in FIG. 2, a perpendicular magnetic recording medium 20 has a recording layer 21 provided on the orientation controlling intermediate layer 15. This recording layer 21 is made up of a first recording layer $21_1$, a second recording layer $21_2$, . . . , and an nth recording layer $21_n$ which are successively stacked on the orientation controlling intermediate layer 15, where n is an integer greater than or equal to 3. Otherwise, the structure of the perpendicular magnetic recording medium 20 is the same as that of the perpendicular magnetic recording medium 10 shown in FIG. 1. Because the recording layer 21 has a multi-layer structure, the thickness of each of the recording layers $21_1$ through $21_n$ of the multi-layer structure can be reduced, to avoid the grain diameters of the magnetic grains from becoming large, and it is possible to further reduce the medium noise.

The recording layers $21_1$ through $21_n$ of the recording layer 21 may be made of materials similar to those described above for the first and second recording layers 16 and 17 of the first embodiment. In addition, it is preferable that the recording layer $21_1$ closest to the substrate 11 is formed by a granular layer. In this case, for reasons similar to those described above with respect to the first embodiment, the arrangements of the magnetic grains, the crystallinity and the crystal orientation of the first recording layer 211 itself and the second through nth recording layers 212 through 21n are improved, due to the effects of the good crystallinity and crystal orientation of the orientation controlling intermediate layer 15. As a result, the medium noise generated from the recording layer 21 as a whole is reduced, the orientation or alignment distribution of the axes of easy magnetization of the recording layer 21 is reduced, and the recording and reproducing characteristics of the perpendicular magnetic recording medium 20 are improved.

Similarly to the perpendicular magnetic recording medium 10 of the first embodiment, the orientation or alignment distribution of the axes of easy magnetization of the recording layer 21 of the perpendicular magnetic recording medium 20 of this second embodiment is reduced by the orientation controlling underlayer 14 via the orientation controlling intermediate layer 15, and the recording and reproducing characteristics are improved, even when the recording layer 21 has the multi-layer structure. Furthermore, since the medium noise is reduced by the multi-layer structure of the recording layer 21, it is possible to further improve the SNR.

Next, a description will be given of the crystal orientations of recording layers, the magnetic characteristics, and the recording and reproducing characteristics of embodiment samples and comparison examples, by referring to FIG. 3.

The first embodiment sample Emb1 is a magnetic disk that has the same structure as the perpendicular magnetic recording medium 10 of the first embodiment shown in FIG. 1.

First, after cleaning and drying a chemically tempered glass substrate, an Ar gas atmosphere was set to a gas pressure of 0.399 Pa, and a soft magnetic back layer having a thickness of 50 nm was formed on the glass substrate by a D.C. magnetron sputtering method using a CoNbZr sputtering target. In addition, an amorphous layer having a thickness of 4 nm was formed on the soft magnetic back layer by the D.C. magnetron sputtering method using a Ta sputtering target.

Next, an Ar gas atmosphere was set to a gas pressure of 0.399 Pa, and an orientation controlling underlayer having a thickness of 3 nm was formed on the amorphous layer by the D.C. magnetron sputtering method using a $Ni_{90}Cr_{10}$ sputtering target. The composition of the $Ni_{90}Cr_{10}$ sputtering target indicates the content of each element in at. %, and the same designation is used for each composition described hereunder Further, an orientation controlling intermediate layer having a thickness of 25 nm was formed on the orientation controlling underlayer by the D.C. magnetron sputtering method using an Ru sputtering target.

Thereafter, an Ar gas atmosphere was set to a gas pressure of 0.399 Pa, and a first recording layer having a thickness of 10 nm was formed on the orientation controlling intermediate layer by the D.C. magnetron sputtering method using a CoCrPt—$SiO_2$ composite sputtering target. In addition, a second recording layer having a thickness of 10 nm was formed on the first recording layer by the D.C. magnetron sputtering method using a CoCrPtB sputtering target.

Next, an Ar gas atmosphere was set to a gas pressure of 0.399 Pa, and a protection layer having a thickness of 4 nm was formed on the second recording layer by the D.C. magnetron sputtering method using a carbon sputtering target.

The stacked structure obtained by the processes described above was released to the atmosphere, and a lubricant layer made of perfluoropolyether and having a thickness of 1 nm was formed on the protection layer by submerging (or dipping) the stacked structure in the lubricant.

The first embodiment sample Emb1 was made by the processes described above. In the process of forming the soft magnetic back layer up to the process of forming the protection layer are carried out without heating the glass substrate, and the layers were formed or the structures were transported between layer forming chambers under a vacuum or decompression atmosphere.

The second, third and fourth embodiment samples Emb2, Emb3 and Emb4 are magnetic disks that have the same structure as the perpendicular magnetic recording medium 10 of the first embodiment shown in FIG. 1. The second, third and fourth embodiment samples Emb2, Emb3 and Emb4 were made similarly to the first embodiment sample Emb1, except that the orientation controlling underlayers of the second, third and fourth embodiment samples Emb2, Emb3 and Emb4 were respectively formed using an $Ni_{85}Cr_{15}$ sputtering target, an $Ni_{60}Cu_{40}$ sputtering target and an $Ni_{50}Cu_{50}$ sputtering target.

First and second comparison examples Cmp1 and Cmp2, which do not use the present invention, were also made for comparison purposes. The first comparison example Cmp1 was made similarly to the first embodiment sample Emb1 except that no orientation controlling underlayer was formed. The second comparison example Cmp2 was made similarly to the first embodiment sample Emb1 except that an NiFe orientation controlling underlayer having a thickness of 4 nm was formed in place of the $Ni_{90}Cr_{10}$ orientation controlling underlayer.

FIG. 3 is a diagram showing the crystal orientations of recording layers, the magnetic characteristics, and the recording and reproducing characteristics of the embodiment samples Emb1 through Emb4 and the comparison examples Cmp1 and Cmp2.

The crystal orientation shown in FIG. 3 is represented by the diffraction intensity (maximum intensity of the diffraction ray) corresponding to the Co(0002) crystal face of the recording layer obtained by the X-ray diffraction method and the half-value width ($\Delta\theta50$) of the rocking curve of the diffraction ray. Cu—K$\alpha$ was used as the X-ray source.

In addition, the magnetic characteristics shown in FIG. 3 are represented based on the hysteresis loop measured by a Kerr effect measuring apparatus using the Kerr effect by applying a magnetic field in a direction perpendicular to the substrate surface. The coercivity (perpendicular coercivity), the nucleation (magnetic) field and the squareness ratio were obtained from the measure hysteresis loop. The nucleation field is the magnitude of the magnetic field at which the magnetization in the second quadrant of the hysteresis loop begins to decrease. The hysteresis loop becomes rectangular when the nucleation field has a negative value and the absolute value of this nucleation field becomes larger, and this rectangular hysteresis loop indicates a good magnetic characteristic. In addition, the squareness ratio is obtained by dividing the remanent magnetization by the saturation magnetization, and the hysteresis loop becomes rectangular when the squareness ratio becomes closer to 1.0, and this rectangular hysteresis loop indicates the good magnetic characteristic.

Moreover, the SNR was obtained as the recording and reproducing characteristic. The SNR was obtained using a single-pole recording head at the time of the recording and a ferromagnetic tunneling resistance effect reproducing head at the time of the reproduction. The linear recording density was set to 400 kbpi.

As may be seen from FIG. 3, the first through fourth embodiment samples Emb1 through Emb4 have a large diffraction intensity and an extremely small half-value width ($\Delta\theta50$) compared to the first comparison example Cmp1. This is because the recording layer of the magnetic disks according to the first through fourth embodiment samples Emb1 through Emb4 has a Co(0002) crystal face that is parallel with respect to the substrate surface, that is, c-axes (axes of easy magnetization) that are oriented perpendicularly to the substrate surface, and the orientation or alignment distribution of the axes of easy magnetization is small, due to the effects of the orientation controlling underlayer.

With regard to the magnetic characteristics, the first through fourth embodiment samples Emb1 through Emb4 have a coercivity (perpendicular coercivity) that is considerably large compared to the first comparison example Cmp1. Further, the first through fourth embodiment samples Emb1 through Emb4 have a nucleation field that has a negative value and a large absolute value compared to the first comparison example Cmp1. Moreover, the first through fourth embodiment samples Emb1 through Emb4 have a squareness ratio that is 1.0 in comparison to the first comparison example Cmp1 which has a squareness ratio that is only 0.7. Therefore, it was confirmed from these magnetic characteristics that the hysteresis loop for the first through fourth embodiment samples Emb1 through Emb4 is closer to the rectangular shape and the magnetic characteristics are more preferable compared to the first comparison example Cmp1.

Furthermore, with regard to the recording and reproducing characteristics, the first through fourth embodiment samples Emb1 through Emb4 have an SNR that is improved by 7 dB or more compared to the first comparison example Cmp1.

Therefore, compared to the first comparison example Cmp1 which is not provided with the orientation controlling underlayer, the first, second, third and fourth embodiment samples Emb1, Emb2, Emb3 and Emb4 respectively provided with $Ni_{90}Cr_{10}$, $Ni_{85}Cr_{15}$, $Ni_{60}Cu_{40}$ and $Ni_{50}Cu_{50}$ orientation controlling underlayers have reduced orientation or alignment distribution of the axes of easy magnetization, improved magnetic characteristics, and greatly improved SNR.

The first through fourth embodiment samples Emb1 through Emb4 have a crystal orientation that is approximately the same as that of the second comparison example Cmp2. However, the first through fourth embodiment samples Emb1 through Emb4 have magnetic characteristics that are slightly better and an SNR that is increased compared to those of the second comparison example Cmp2. This is because the orientation controlling underlayer of the second comparison example Cmp2 is made of a ferromagnetic material (NiFe) which becomes a noise generating source. Accordingly, the first through fourth embodiment samples Emb1 through Emb4 have an SNR which is improved compared to the second comparison example Cmp2, that is, a case where the orientation controlling underlayer is made of a ferromagnetic material.

Figure 4:
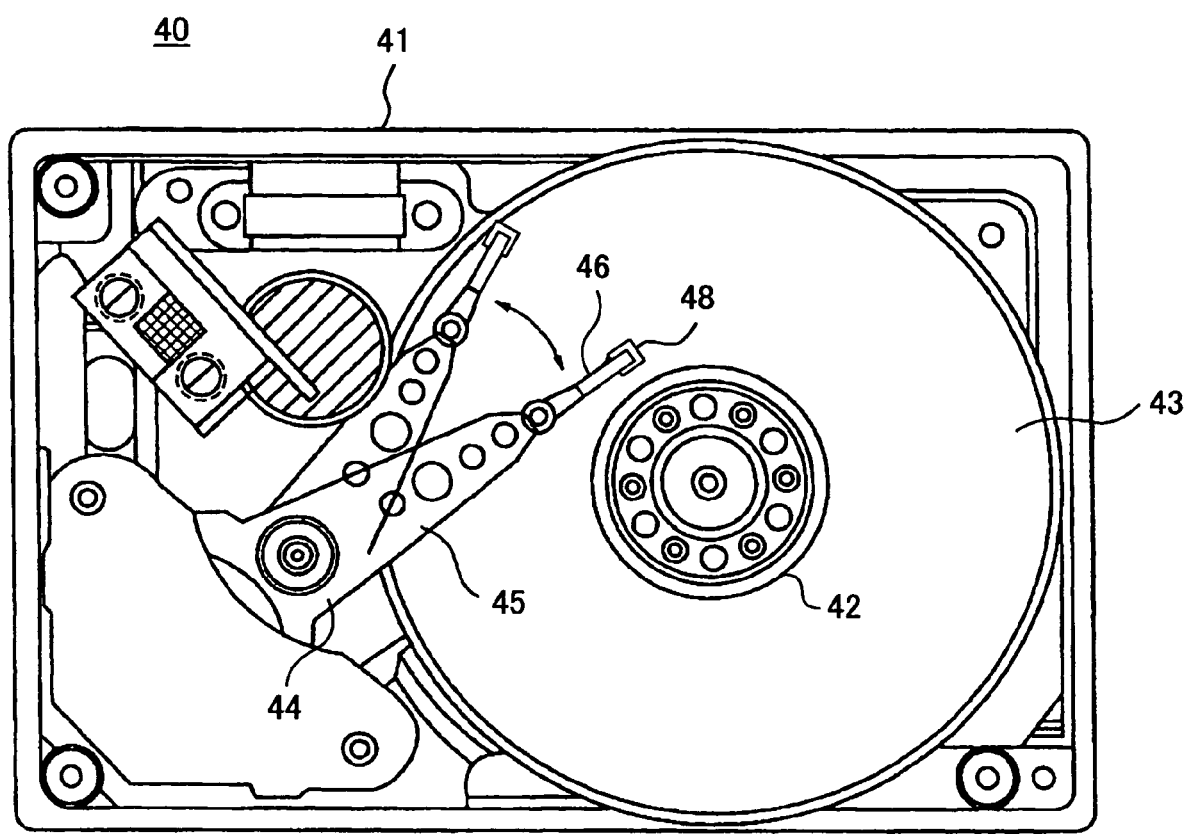
FIG. 4 is a plan view showing an important part of an embodiment of a magnetic storage apparatus according to the present invention.

Next, a description will be given of an embodiment of a magnetic storage apparatus according to the present invention, by referring to FIG. 4. FIG. 4 is a plan view showing an important part of this embodiment of the magnetic storage apparatus according to the present invention. This embodiment of the magnetic storage apparatus is provided with the perpendicular magnetic recording medium 10 of the first embodiment or the perpendicular magnetic recording medium 20 of the second embodiment described above.

As shown in FIG. 4, a magnetic storage apparatus 40 has a housing 41. A hub 42 which is driven by a spindle (not shown), a perpendicular magnetic recording medium 43 that is fixed on the hub and is rotated thereby, an actuator unit 44, an arm 44 which is mounted on the actuator unit 44 and moves in a radial direction of the perpendicular magnetic recording medium 43, a suspension 46, and a magnetic head 48 which is supported on the suspension 46 are provided within the housing 41.

For example, the magnetic head 48 is made up of a single pole recording head and a reproducing head that is provided with a giant magneto resistive (GMR) element. The recording head records information on the perpendicular magnetic recording medium 43, and the reproducing head reproduces information from the perpendicular magnetic recording medium 43.

Although an illustration of the single pole recording head will be omitted, the single pole recording head has a main pole that is made of a soft magnetic material and applies a recording magnetic field on the perpendicular magnetic recording medium 43, a return yoke that is magnetically coupled to the main pole, a recording coil for inducing the recording magnetic field to the main pole and the return yoke, and the like. The single pole recording head applies the recording magnetic field from the main pole in a perpendicular direction with respect to the perpendicular magnetic recording medium 43, and forms perpendicular magnetizations in the perpendicular magnetic recording medium 43.

The GMR element of the reproducing head senses the direction of the magnetic field of the magnetization that leaks from the perpendicular magnetic recording medium 43, as a change in resistance, so as to obtain the information recorded in the recording layer of the perpendicular magnetic recording medium 43. It is of course possible to use other elements, such as a ferromagnetic tunnel junction magneto resistive (TMR) element, in place of the GMR element.

In this embodiment of the magnetic storage apparatus, the perpendicular magnetic recording medium 43 has the structure of the perpendicular magnetic recording medium 10 of the first embodiment or the perpendicular magnetic recording medium 20 of the second embodiment described above. Since the orientation or alignment distribution of the axes of easy magnetization of the recording layer of the perpendicular magnetic recording medium 43 is reduced, and this perpendicular magnetic recording medium 43 has good recording and reproducing characteristics, it is possible to realize a high-density recording in the magnetic storage apparatus 40.

The basic structure of the magnetic storage apparatus 40 of this embodiment is not limited to that shown in FIG. 4, and other known and suitable basic structures may be used instead. In addition, the magnetic head 48 is not limited to the structure described above, and the structures of other known and suitable magnetic heads having a recording element and a reproducing element may be used instead. In addition, it is possible to provide more than 1 perpendicular magnetic recording medium 43 within the housing 41. In a case where a plurality of perpendicular magnetic recording media 43 are provided within the housing 41, at least one of the perpendicular magnetic recording medium 43 has the structure of the perpendicular magnetic recording medium 10 of the first embodiment or the perpendicular magnetic recording medium 20 of the second embodiment described above. Moreover, if the perpendicular magnetic recording medium 43 is a magnetic tape, a magnetic tape apparatus (not shown) having a known structure may be used in place of the magnetic storage apparatus 40.

This application claims the benefit of a Japanese Patent Application No. 2006-208431 filed Jul. 31, 2006, in the Japanese Patent Office, the disclosure of which is hereby incorporated by reference.

Further, the present invention is not limited to these embodiments, but various variations and modifications may be made without departing from the scope of the present invention.

What is claimed is:

1. A perpendicular magnetic recording medium comprising:
    a substrate;
    a soft magnetic back layer provided on a surface of the substrate;
    an orientation controlling underlayer provided on the soft magnetic back layer; and
    a recording layer provided above the orientation controlling underlayer and having axes of easy magnetization approximately perpendicular to the surface of the substrate,
    wherein the recording layer is made of a ferromagnetic material having an hcp crystal structure,
    the orientation controlling underlayer is made of a nonmagnetic material having an fcc crystal structure and having NiCu as a main component and a Cu content in a range of 40 at. % to 99 at. %, and
    the soft magnetic back layer has a stacked ferrimagnetic structure made up of a pair of soft magnetic layers that are antiferromagnetically exchange-coupled via a Ru layer.

2. The perpendicular magnetic recording medium as claimed in claim 1, wherein the noamagnetic material forming the orientation controlling underlayer is added with at least one element selected from a group consisting of Fe, Al, Rh, Pd, Ag, Pt and Au.

3. The perpendicular magnetic recording medium as claimed in claim 1, wherein the orientation controlling underlayer has a (111) crystal face that grows preferentially in a direction approximately parallel to the surface of the substrate.

4. The perpendicular magnetic recording medium as claimed in claim 1, wherein the orientation controlling underlayer has a thickness in a range of 1 nm to 20 nm.

5. The perpendicular magnetic recording medium as claimed in claim 1, further comprising:
    an orientation controlling intermediate layer provided between the orientation controlling underlayer and the recording layer, and made of a nonmagnetic material having an hcp crystal structure.

6. The perpendicular magnetic recording medium as claimed in claim 5, wherein the orientation controlling intermediate layer is made of a material selected from a group consisting of Ru, RuCo, RuCoCr, RuCoB, RuCoCrTa and Ti.

7. The perpendicular magnetic recording medium as claimed in claim 1, further comprising:
an amorphous layer provided between the soft magnetic back layer and the orientation controlling underlayer, and made of a nonmagnetic material having, as a main component, an element selected from a group consisting of Ta, W and Mo.

8. The perpendicular magnetic recording medium as claimed in claim 1, wherein the ferromagnetic material of the recording layer is selected from a group consisting of CoCr, CoPt, CoCrTa, CoCrPt and CoCrPt-M, where M is at least one element selected from a group consisting of B, Mo, Nb, Ta, W and Cu.

9. The perpendicular magnetic recording medium as claimed in claim 8, wherein the ferromagnetic material of the recording layer further includes oxygen.

10. The perpendicular magnetic recording medium as claimed in claim 1, wherein:
said recording layer comprises a plurality of ferromagnetic layers; and
one of said plurality of ferromagnetic layers is made up of magnetic grains made of the ferromagnetic material and a nonsolid solution layer made of a nonmagnetic material surrounding the magnetic grains.

11. The perpendicular magnetic recording medium as claimed in claim 1, wherein:
said recording layer comprises a plurality of ferromagnetic layers; and
one of said plurality of ferromagnetic layers closest to the substrate is made up of magnetic grains made of the ferromagnetic material and a nonsolid solution layer made of a nonmagnetic material surrounding the magnetic grains.

12. The perpendicular magnetic recording medium as claimed in claim 10, wherein the nonsolid solution layer is made of a compound made up of one element selected from a group consisting of Si, Al, Ta, Zr, Y, Ti and Mg, and at least one element selected from a group consisting of O, N and C.

13. The perpendicular magnetic recording medium as claimed in claim 1, wherein the recording layer is formed by a ferromagnetic artificial lattice layer that is made up of alternately stacked thin films of a ferromagnetic element and a nonmagnetic element.

14. The perpendicular magnetic recording medium as claimed in claim 1, wherein:
said recording layer comprises a first recording layer provided above the orientation controlling underlayer and a second recording layer provided on the first recording layer;
said first recording layer is made up of magnetic grains made of the ferromagnetic material and a nonsolid solution layer made of a nonmagnetic material surrounding the magnetic grains; and
said second recording layer is made up of a continuous layer made of the ferromagnetic material.

15. The perpendicular magnetic recording medium as claimed in claim 1, wherein:
said recording layer comprises a first recording layer provided above the orientation controlling underlayer and a second recording layer provided on the first recording layer; and
an anisotropic field $Hk1$ of the first recording layer and an anisotropic field $Hk2$ of the second recording layer satisfy a relationship $Hk1>Hk2$.

16. The perpendicular magnetic recording medium as claimed in claim 15, wherein each of the first and second recording layers is made up of magnetic grains made of the ferromagnetic material and a nonsolid solution layer made of a nonmagnetic material surrounding the magnetic grains.

17. A magnetic storage apparatus comprising:
at least one perpendicular magnetic recording medium comprising a substrate, a soft magnetic back layer provided on a surface of the substrate and having a stacked ferrimagnetic structure made up of a pair of soft magnetic layers that are antiferromagnetically exchange-coupled via a Ru layer, an orientation controlling underlayer provided on the soft magnetic back layer, and a recording layer provided above the orientation controlling underlayer and having axes of easy magnetization approximately perpendicular to the surface of the substrate, wherein the recording layer is made of a ferromagnetic material having an hcp crystal structure, and the orientation controlling underlayer is made of a nonmagnetic material having an fcc crystal structure and having NiCu as a main component and a Cu content in a range of 40 at. % to 99 at. %; and
a head comprising a recording element and a reproducing element, and configured to record information on the perpendicular magnetic recording medium by the recording element and to reproduce information from the perpendicular magnetic recording medium by the reproducing element.

18. The magnetic storage apparatus as claimed in claim 17, wherein the nonmagnetic material forming the orientation controlling underlayer of the perpendicular magnetic recording medium is added with at least one element selected from a group consisting of Fe, Al, Rh, Pd, Ag, Pt and Au.

* * * * *